330-315

SEARCH ROOM

July 29, 1958 R. S. PARKER 2,844,987

MULTI-COLOR TELEVISION VIEWER FOR CHILDREN

Filed July 27, 1954

T2657

INVENTOR.

Robert S. Parker

BY Victor J. Evans & Co.

ATTORNEYS 2,844,987
Patented July 29, 1958

2,844,987

MULTI-COLOR TELEVISION VIEWER FOR CHILDREN

Robert S. Parker, Dover, N. J.

Application July 27, 1954, Serial No. 446,031
1 Claim. (Cl. 88—1)

This invention relates to television of the type wherein a color filter or screen is used by each individual observing a television screen, and in particular, a disc divided into sections of different colors having an opening designed to be positioned over the nose in each section and having a strap adapted to retain the disc in position with one of the sections extended over the eyes of an individual.

The purpose of this invention is to provide a color device for television that is particularly adapted for use by children and wherein the device is adapted to be adjusted to show the television picture in different colors.

Various attempts have been made to produce color in a television picture with rotating discs of various colors positioned in front of the picture tube and other devices in the form of glasses with colored lenses or filters have been provided for individual use. Such devices, however, are not satisfactory because it is impossible to place the proper color on an area or object of that color and because the individual is restricted to a certain color. With this thought in mind, this invention contemplates a color television filter in which an individual may turn the filter or screen to substantially any color desired whereby the picture may be viewed with a color tint pleasing to the individual.

The object of this invention is, therefore, to provide a color television screen that is adapted for individual use and that is readily adjustable to different colors.

Another object of the invention is to provide a color television filter or screen that is adapted to be used by individuals and that may be removed and replaced as desired.

A further object of the invention is to provide a color television device adapted for individual use in which the device is of a simple and economical construction.

With these and other objects and advantages in view, the invention embodies a mounting disc, a color disc rotatably mounted on the mounting disc and in which the periphery of the disc is divided into sections of different colors and a strap attached to the pivotal mounting element of the disc and adapted to retain the disc in position on the head of an individual with one of the color sections positioned over the eyes of the individual and with a notch in the edge of the color disc positioned over the nose of the individual.

Other features and advantages of the invention will appear from the following description taken in connection with the drawings, wherein.

Figures 1, 2, 3:
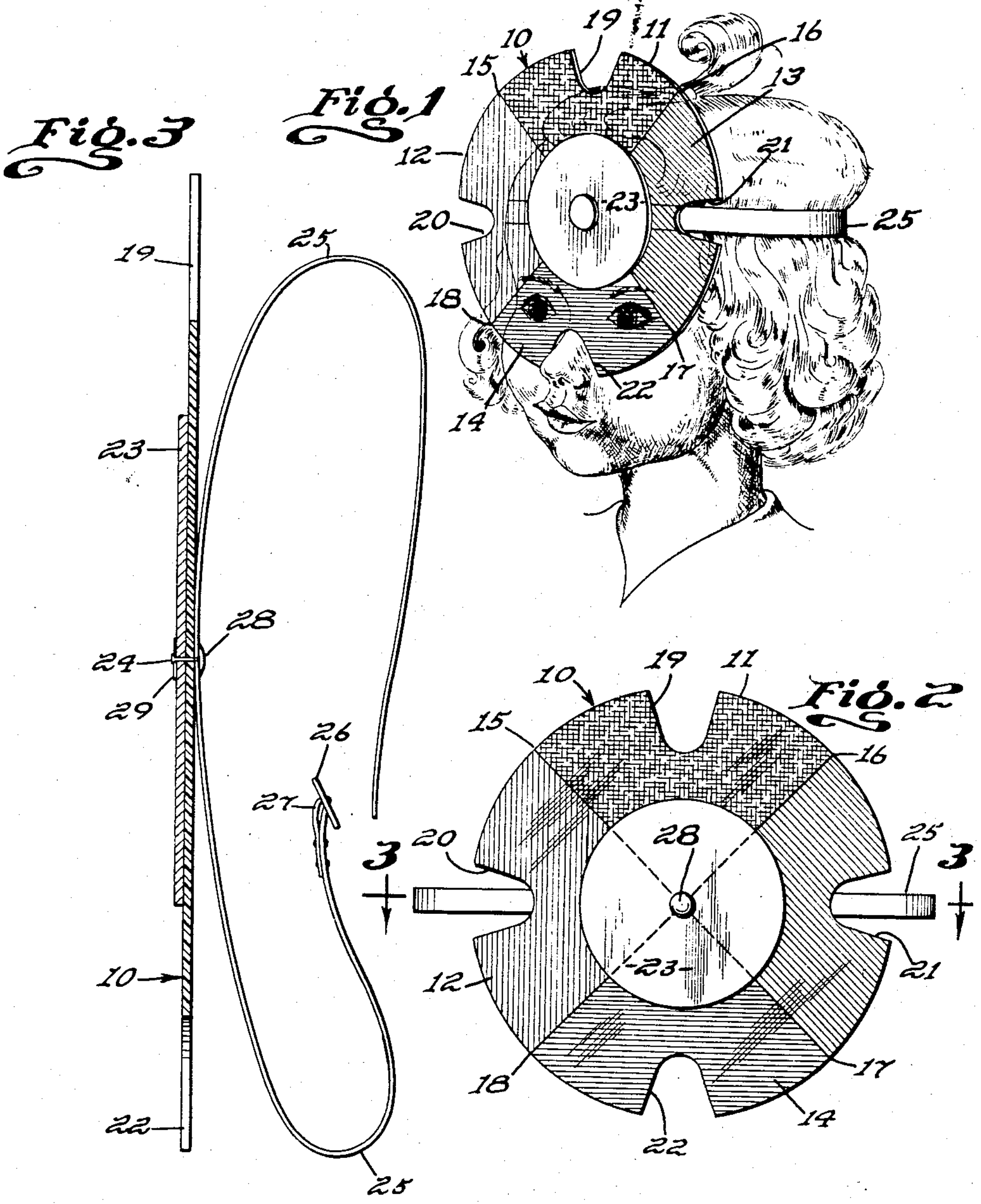
Figure 1 is a view illustrating the improved individual color television screen showing the device positioned upon the head of a child and thereby illustrating the device in use.
Figure 2 is a front elevational view of the improved color television screen, the parts being shown on an enlarged scale.
Figure 3 is a cross section through the disc taken on line 3—3 of Figure 2, showing the device with the parts on a still further enlarged scale and illustrating a strap for mounting the device on the head of a child with the strap being shown in elevation.

Referring now to the drawings wherein like reference characters denote corresponding parts, the improved color television screen or filter of this invention includes a color disc 10 divided into sections or segments 11, 12, 13 and 14 by divisional lines 15, 16, 17 and 18, and the colored sections of the disc being provided with nose-receiving recesses 19, 20, 21 and 22; a mounting disc 23, a pin 24 pivotally mounting the disc 10 upon the mounting disc 23 and a strap 25 having a buckle 26 in a loop 27 on one end by which the discs are adjustably mounted upon the head of a child or the like.

The pin 24 is provided with a head 28 on the end extended through the strap and the opposite end is secured in a disc 29 positioned on the face of the mounting disc.

The disc 10 is preferably made of a suitable substantially transparent plastic adapted to retain color tints and with the parts assembled as shown and described the device may be carried in a handbag or the like and used as desired.

In use the disc 10 is positioned against the forehead with one of the notches or recesses positioned over the nose of an individual and with the device in this position, as shown in Figure 1, one of the colored sections covers the eyes so that color tints are brought into the picture.

It will be understood that modifications, within the scope of the appended claim, may be made in the design and arrangement of the parts without departing from the spirit of the invention.

What is claimed is:

In a multi-color viewer, the combination which comprises a color disc of translucent material, a mounting disc positioned on the face of the color disc and concentric therewith, a strap having a buckle therein, an a pin extended through the color and mounting discs and strap for securing the discs to the strap, said color disc having radially disposed divisional lines dividing an area on the periphery into segments, and the segments being of different colors, each segment having a nose receiving notch positioned midway of the length thereof and extended inwardly from the peripheral edge of the color disc whereby with one of the notches positioned on the nose of a wearer and with the strap extended around the back of the head the lines of sight from the eyes of the wearer pass through the color portion of the segment in which the nose receiving notch is positioned.

References Cited in the file of this patent

UNITED STATES PATENTS

| | | |
|---|---|---|
| 1,201,813 | Fitzwilliam | Oct. 17, 1916 |
| 1,232,812 | Kirchner | July 10, 1917 |
| 1,514,527 | Hulett | Nov. 4, 1924 |
| 1,842,675 | Kannenberg | Jan. 26, 1932 |
| 2,286,219 | Martinek | June 16, 1942 |
| 2,384,260 | Goldsmith | Sept. 4, 1945 |